(12) United States Patent
Tan et al.

(10) Patent No.: US 6,831,796 B2
(45) Date of Patent: Dec. 14, 2004

(54) AMPLITUDE MODULATION DETECTION FOR HARD DISC DRIVE WRITE OPERATION

(75) Inventors: YeongHeng Tan, Singapore (SG); Siew Kin Chow, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 283 days.

(21) Appl. No.: 09/894,429

(22) Filed: Jun. 27, 2001

(65) Prior Publication Data

US 2002/0027730 A1 Mar. 7, 2002

Related U.S. Application Data

(60) Provisional application No. 60/225,250, filed on Aug. 15, 2000.

(51) Int. Cl.$^7$ .............................. G11B 27/36; G11B 5/09

(52) U.S. Cl. .............................. 360/31; 360/53; 360/75

(58) Field of Search .............................. 360/77.08, 31, 360/53, 75; 369/53.15, 116

(56) References Cited

U.S. PATENT DOCUMENTS

| | | | | |
|---|---|---|---|---|
| 5,247,254 A | * | 9/1993 | Huber et al. | 360/53 |
| 5,570,332 A | | 10/1996 | Heath et al. | 369/50 |
| 5,878,015 A | * | 3/1999 | Schell et al. | 369/116 |
| 5,890,209 A | * | 3/1999 | Dobbek | 360/78.04 |
| 6,275,346 B1 | * | 8/2001 | Kim et al. | 360/31 |
| 6,282,052 B1 | | 8/2001 | Galloway et al. | 360/78.09 |
| 6,304,408 B1 | | 10/2001 | Cole | 360/77.02 |
| 6,317,281 B1 | * | 11/2001 | Ogawa et al. | 360/60 |
| 6,339,811 B1 | | 1/2002 | Gaertner et al. | 711/112 |
| 6,388,413 B1 | * | 5/2002 | Ng et al. | 318/560 |
| 6,469,978 B1 | * | 10/2002 | Ohata et al. | 369/53.15 |
| 6,490,114 B1 | * | 12/2002 | Gill et al. | 360/69 |
| 6,512,644 B1 | * | 1/2003 | Hall et al. | 360/31 |

\* cited by examiner

Primary Examiner—David Hudspeth
Assistant Examiner—Glenda Rodriguez
(74) Attorney, Agent, or Firm—Westman, Champlin & Kelly, P.A.

(57) ABSTRACT

The present invention is directed to detecting amplitude modulation on the written signal as a result of head movement along the z-axis during the write operation, before the head has had sufficient time to stabilize after seeking from a different track.

19 Claims, 7 Drawing Sheets

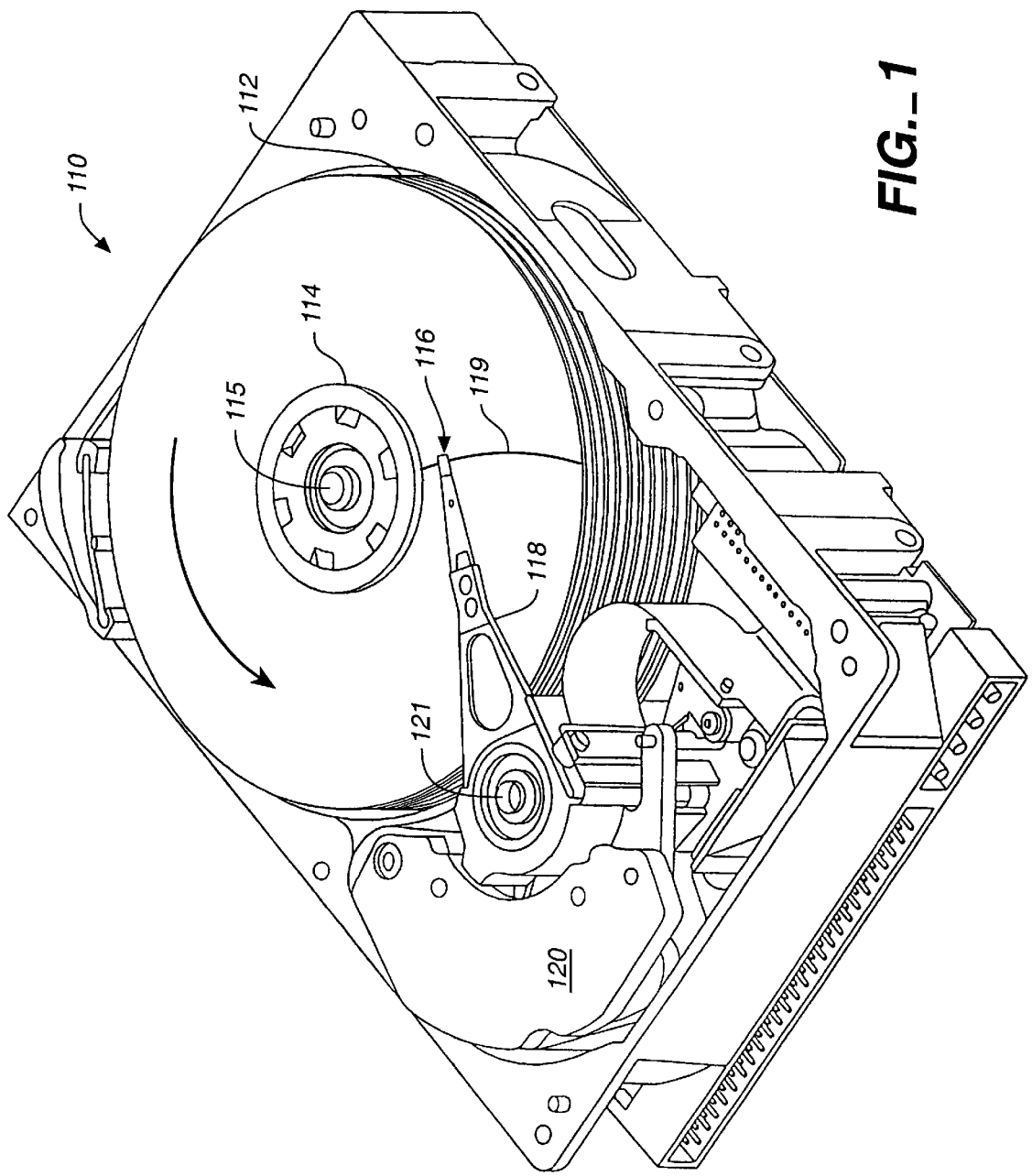
FIG._1

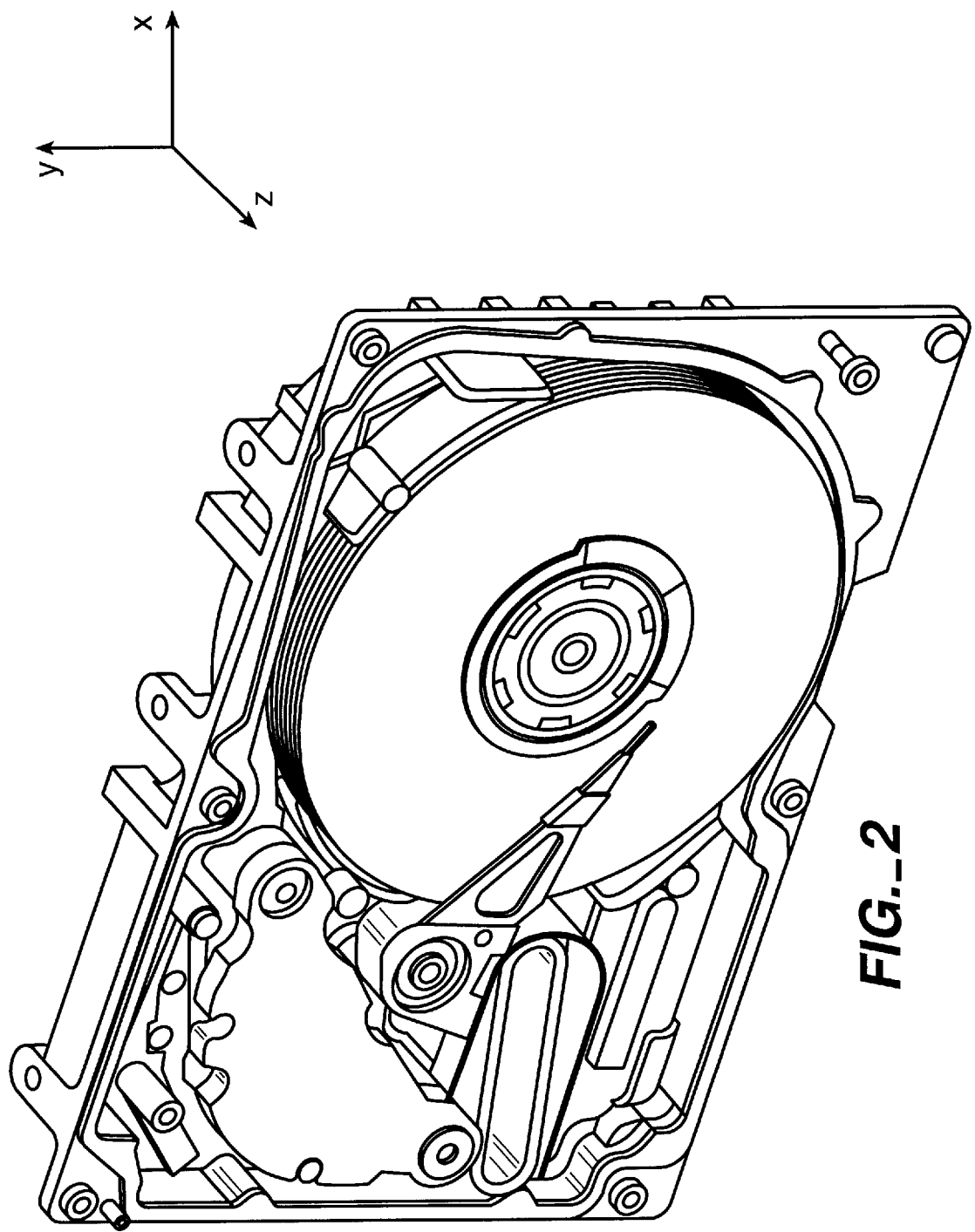
FIG._2

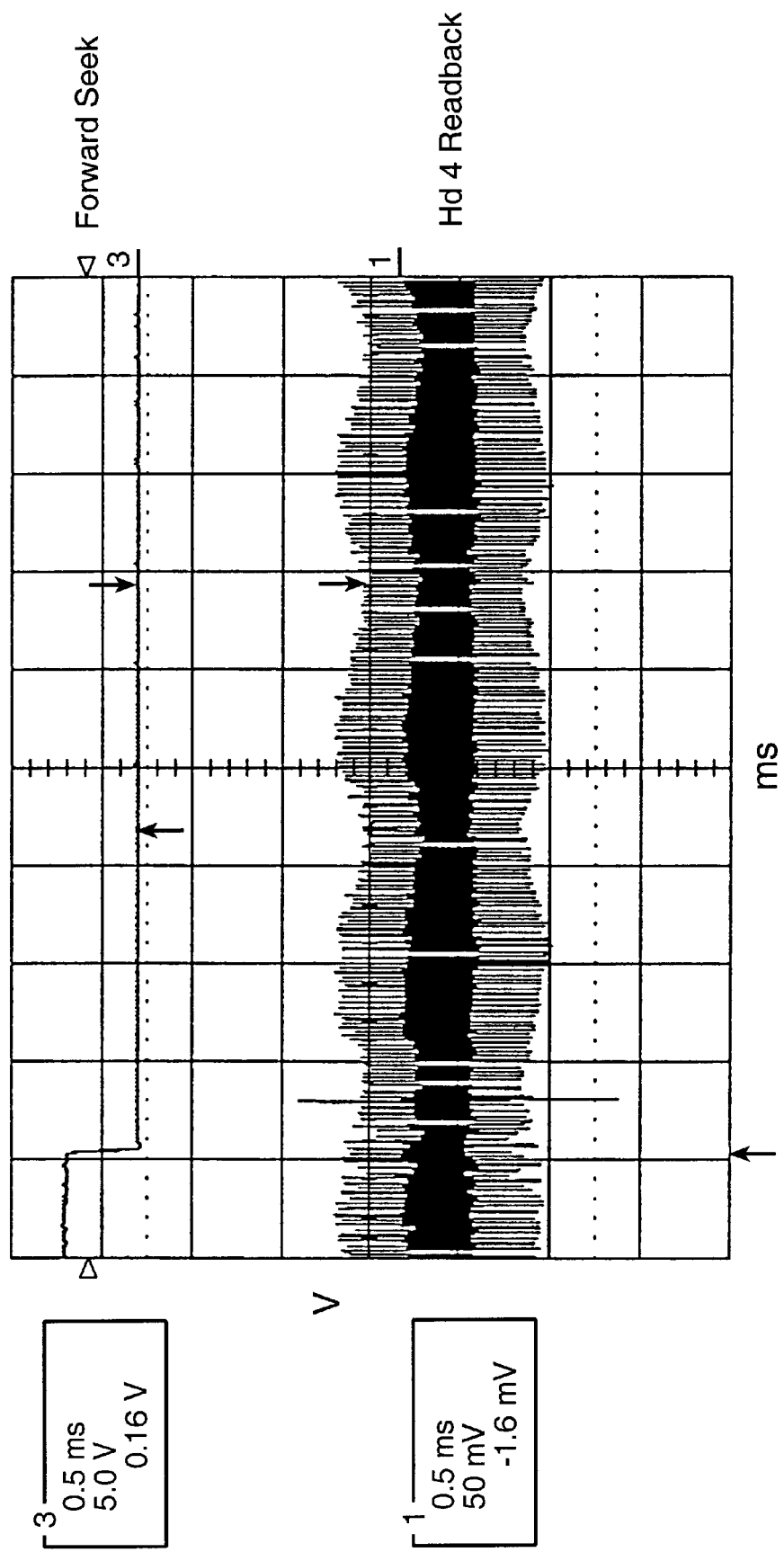
FIG._3

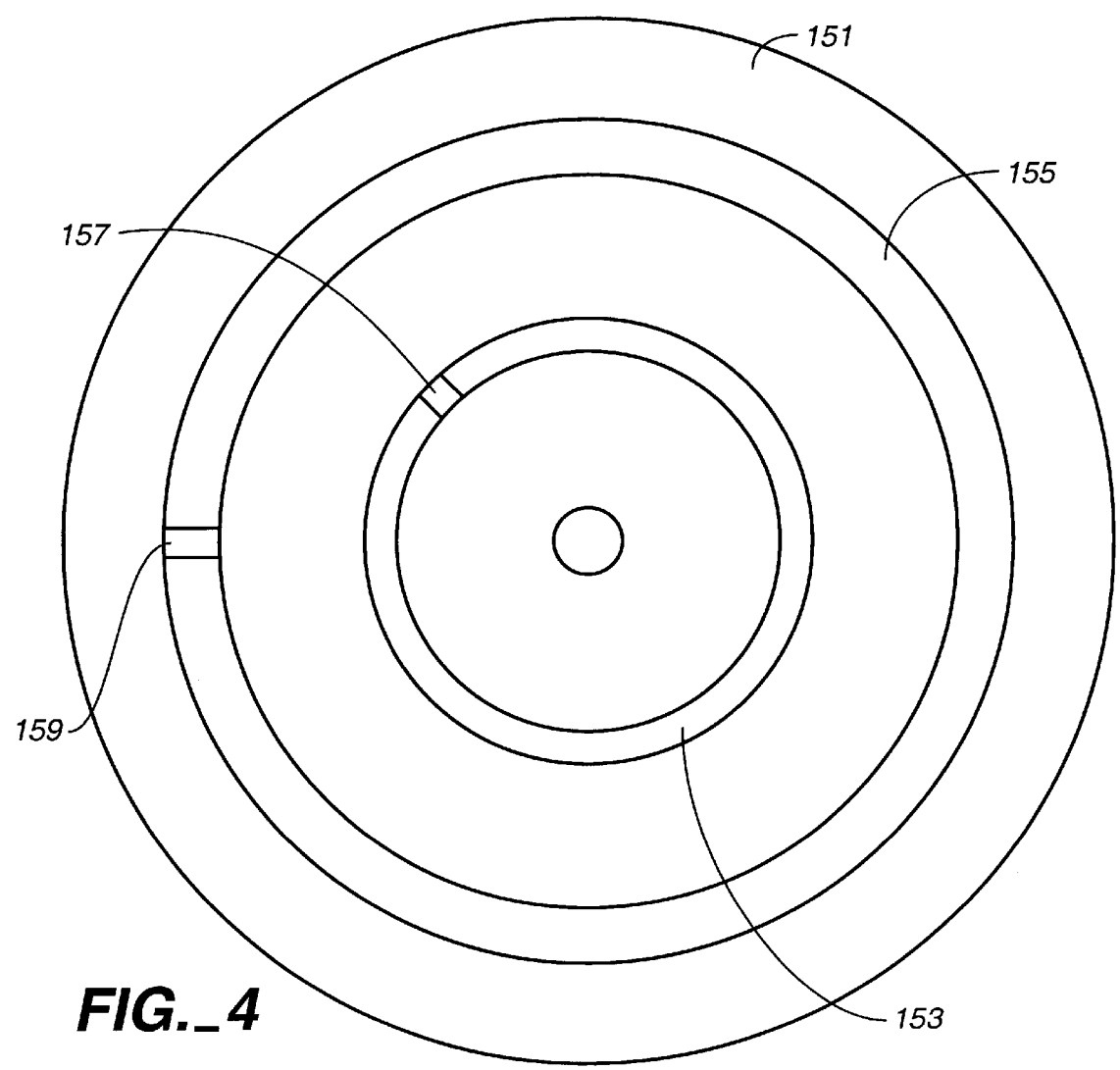
FIG._4

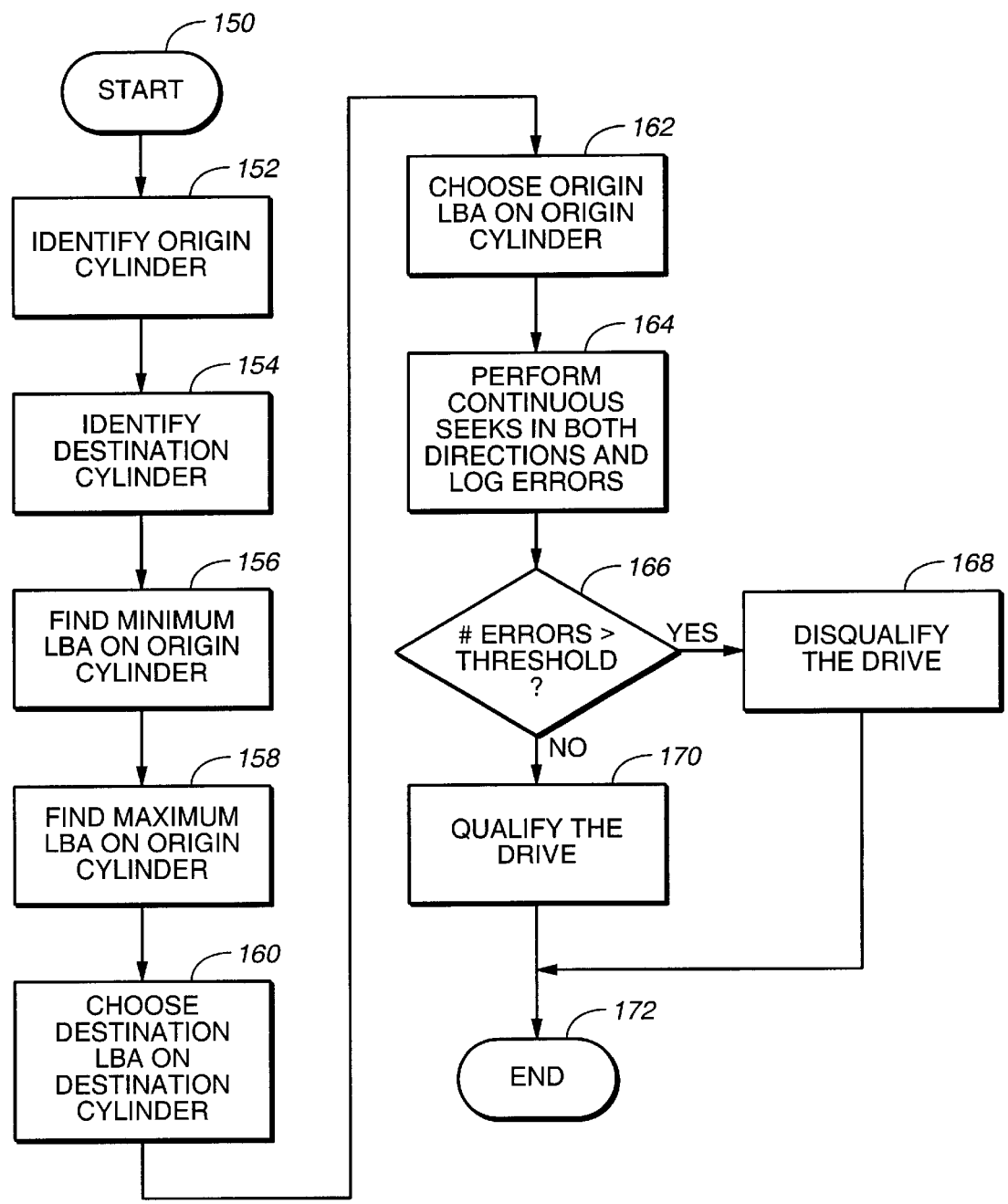
FIG._5

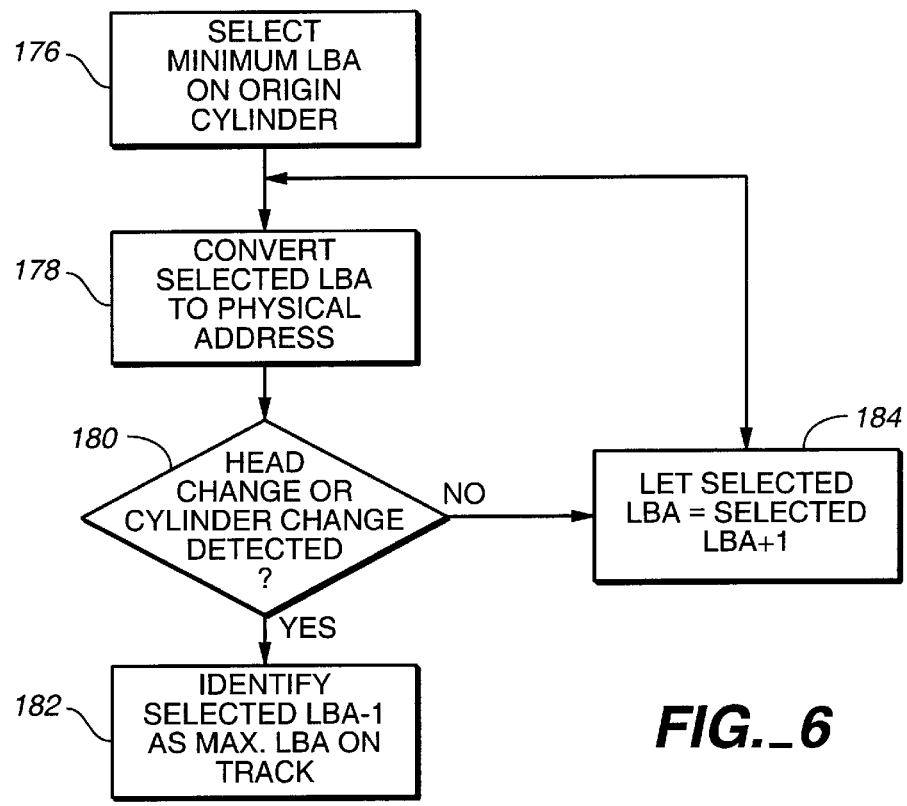
FIG._6
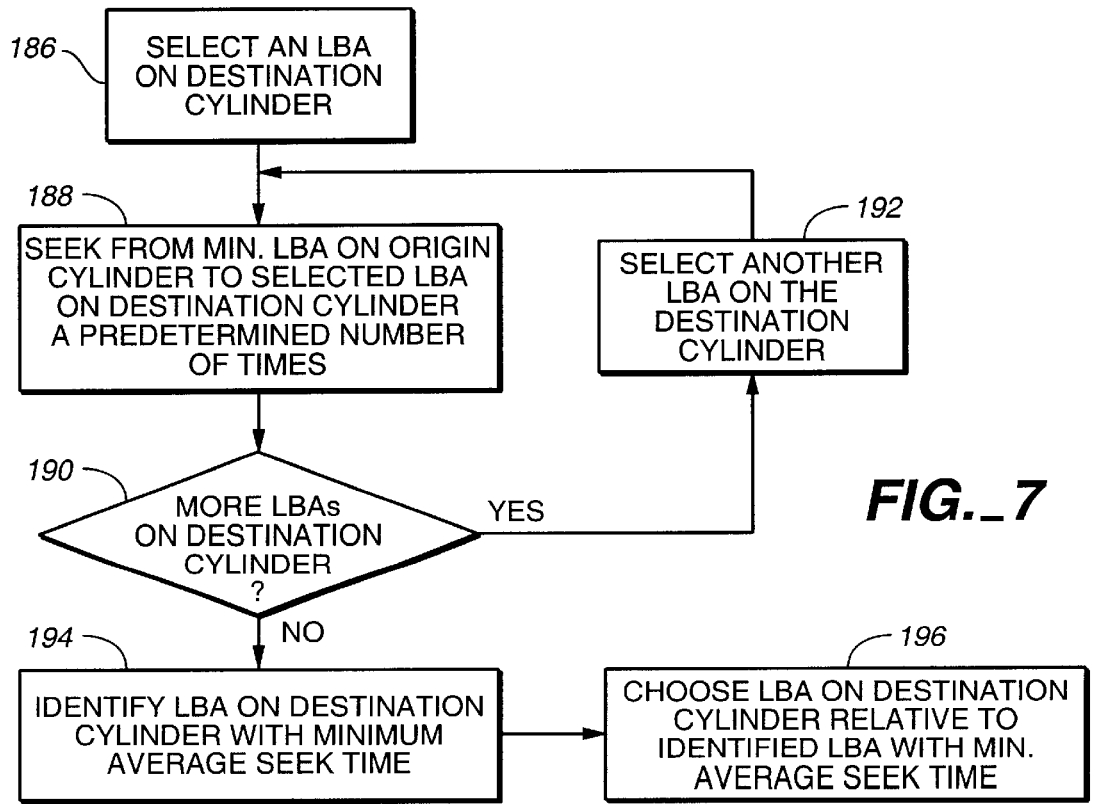
FIG._7

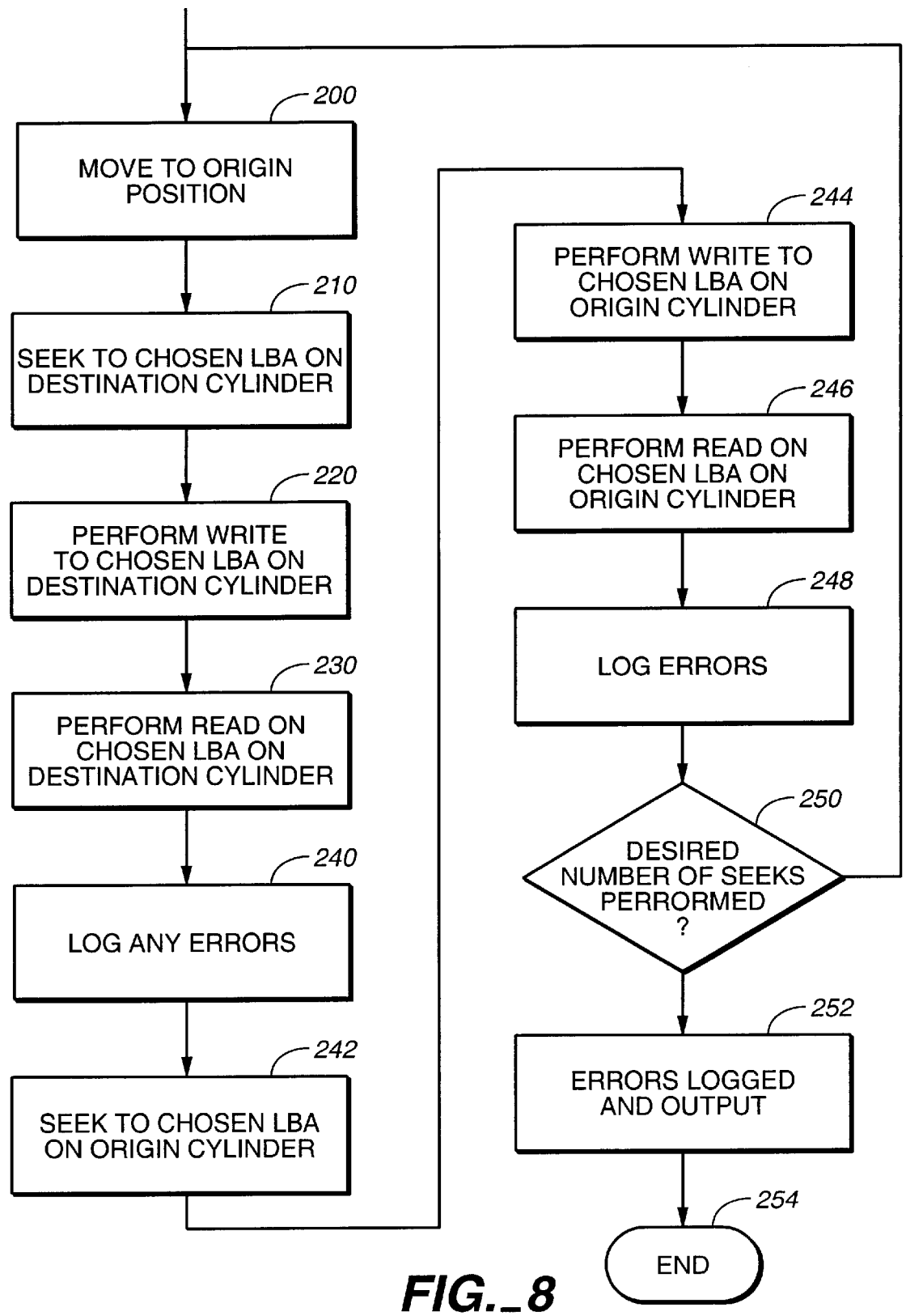
FIG._8

AMPLITUDE MODULATION DETECTION FOR HARD DISC DRIVE WRITE OPERATION

REFERENCE TO CO-PENDING APPLICATION

The present application claims priority from provisional application Ser. No. 60/225,250, filed on Aug. 15, 2000, entitled AMPLITUDE MODULATION SCREEN FOR HARD DRIVE WRITE OPERATION.

FIELD OF THE INVENTION

The present invention deals with qualifying hard disk drives. More specifically, the present invention deals with detecting amplitude modulation on a written signal on a disc drive as a result of head movement in the z-axis during the write operation.

BACKGROUND OF THE INVENTION

A typical disc drive includes one or more discs mounted for rotation on a hub or spindle. A typical disc drive also includes one or more transducers supported relative to surfaces of the discs in the disc drive to read information from, and write information to, the discs. The transducers along with any air bearings associated therewith are collectively referred to as a data head. A drive controller is conventionally used for controlling the disc drive system based on commands received from a host system. The drive controller controls the disc drive to retrieve information from the disc and to store information on the disc.

An actuator operates within a servo system and typically includes an actuator arm that supports a flexure or flexure assembly which, in turn, supports the data head. The actuator moves the data head radially over the disc surface for track seek operations and holds the transducer directly over a track on the disc surface for track following operations.

Information is typically stored on the discs by providing a write signal to the data head to encode information on the surface of the disc representing the data to be stored. In retrieving data from the disc, the drive controller controls the actuator so that the data head flies above the disc, sensing the information on the disc, and generating a read signal based on that information. The read signal is then decoded by the drive controller to recover the data represented by the information stored on the disc, and consequently represented in the read signal provided by the data head.

An emerging market for disc drives involves home entertainment systems. In such systems, a user may wish to simultaneously record several channels of television programming, play a movie, download compact disc-quality music from a global network, and host a network game, all using a single audio visual video controller.

In order to accomplish all of these tasks, the disc drive must be able to retrieve its data without interrupting the incoming data stream. That is, it must continue to be able to record television transmission (for example) in real time while playing back compact disc quality music (for example) stored on the disc drive. Such operations require the drive to seek constantly between two different locations on the disc. One location is designated for recording the incoming information and the other is designated for reading back information which was previously stored. These types of operations demand the disc drive write and read operations to be performed at an ever increasing speed.

The present invention addresses one or more of these and other problems, and offers advantages over the prior art.

SUMMARY OF THE INVENTION

It has been found that one effect of very fast read/write operations is that the data heads may not have sufficiently stabilized after moving from a previous location on a track prior to beginning to write a new location on another track. If head movement happens to be in the z-axis (normal to the surface of the disc) the written signal will exhibit an amplitude modulation (due to head movement in the z-axis) potentially causing unreadable data.

The present invention is directed to detecting amplitude modulation on the written signal as a result of head movement along the z-axis during the write operation, before the head has had sufficient time to stabilize after seeking from a different track.

In one embodiment, the transducer is positioned at an origin location on an origin cylinder. The drive then repeatedly seeks from the origin location to a destination test location on a destination cylinder. For each seeking step, test data is written to the destination test location within approximately two milliseconds (2 ms) of an end of the seeking step. The data is then read and errors are detected in the data read from the destination test location. These errors can be used to detect amplitude modulation on the written signal.

In another embodiment, a minimum seek destination location on a destination cylinder is identified as a location which has a minimum seek time from a chosen location on an origin cylinder. Based on the minimum seek location, a destination test location is chosen which has a predetermined offset on the destination cylinder. Seek operations are then performed from the origin location to the destination test location. For each seeking step, data is written to the destination test location and is read back. Errors are detected at the destination test location by determining whether the data to be written to the destination test location was actually read. These errors are used to qualify the disc drive.

BRIEF DESCRIPTION OF THE DRAWINGS

FIG. 1 illustrates a disc drive in accordance with one embodiment of the present invention.

FIG. 2 illustrate s the z-axis relative to the disc drive shown in FIG. 1.

FIG. 3 illustrates an amplitude modulated read back signal caused by movement of the head in the z-axis direction.

FIG. 4 is a plan view of a disc surface showing tracks which lie in origin and destination cylinders, respectively.

FIG. 5 is a flow diagram illustrating qualification of a disc drive in accordance e with one embodiment of the present invention.

FIG. 6 is a more detailed flow diagram illustrating how a maximum logical block address on an origin cylinder is detected.

FIG. 7 is a more detailed block diagram illustrating how a destination logical block address on a destination cylinder is chosen.

FIG. 8 is a block diagram illustrating continuous seek operations performed to detect errors.

DETAILED DESCRIPTION OF ILLUSTRATIVE EMBODIMENTS

FIG. 1 is a plan view of a disc drive 110. Disc drive 110 includes a disc pack 112, which is mounted on a spindle motor (not shown), by a disc clamp 114. Disc pack 112, in one embodiment, includes a plurality of individual discs that are mounted for co-rotation about a central axis 115. Each disc surface on which data is stored has an associated head gimbal assembly (HGA) 116 which is mounted to an actuator assembly 118 in disc drive 110. The actuator assembly shown in FIG. 1 is of the type known as a rotary moving coil actuator and includes a voice coil motor (VCM) shown generally at 120. Voice coil motor 120 rotates actuator assembly 118 with its attached HGA's 116 about a pivot axis 121 to position HGA's 116 over desired corresponding data tracks (or cylinder) on the associated disc surfaces, under the control of electronic circuitry housed within disc drive 110.

More specifically, actuator assembly 118 pivots about axis 121 to rotate head gimbal assemblies 116 generally along arc 119 which causes head gimbal assemblies 116 to be positioned over a desired one of the tracks (or cylinders) on the surfaces of discs in disc pack 112. HGA's 116 can be moved from tracks lying on the innermost radius of the disc (those tracks representing an innermost cylinder), to tracks lying on the outermost radius of the disc (those tracks representing an outermost cylinder). Each head gimbal assembly 116 has a gimbal that resiliently supports a slider relative to a load beam so that the slider can follow the topography of the disc. The slider, in turn, includes a transducer that is utilized for encoding information on and reading information from, the surface of the disc relative to which it is moving.

As discussed above, when head 116 moves, for example, between the inner cylinder and the outer cylinder during a seek operation, the head may move in the z-axis. FIG. 2 illustrates the z-axis relative to the disc drive 110. It can be seen that the z-axis is normal to the surface of discs in disc pack 112. It can take some time for the head to stabilize in the direction of the z-axis. Therefore, when data is written prior to that stabilization, the written data can exhibit an amplitude modulation.

FIG. 3 illustrates such an amplitude modulation. FIG. 3 is a graph of the read back signal in volts plotted against milliseconds for data read from a cylinder on one of discs 112, wherein the data was written after a seek operation and prior to the head having time to stabilize in the z direction. It can be seen from FIG. 3 that the read back signal is amplitude modulated. This modulation is due to the head moving in the z direction as it is writing data to the disc.

Prior testing techniques were not equipped to detect such amplitude modulation, and were thus not equipped to detect errors which arise because of this modulation. In other words, prior tests started seeking from a minimum logical block address on an origin cylinder (such as cylinder 0) to a minimum logical block address on a destination cylinder (such as cylinder 150). After performing this seek operation, data was written to the destination cylinder; however, the data was not written until approximately 4–5 milliseconds after the seek operation was complete. At that time, the amplitude modulation of the data head in the z direction had already subsided since the data head stabilizes in the z direction in approximately 2 milliseconds. Therefore, subsequent reading of this data did not detect any errors, since the head had already subsided prior to the writing operation.

The present invention involves a test method for detecting the amplitude modulation shown in FIG. 3 and for qualifying disc drives based on such detection. Prior to describing the testing system and method, a brief discussion of the disc surface and examples of terminology for the sake of clarity may be helpful.

FIG. 4 is a plan view of a disc surface 151 of one of the discs in disc pack 112. Disc surface 151 shows a pair of tracks 153 and 155 which are greatly enlarged for the sake of clarity. Each track 153 and 155 is divided into a plurality of logical block addresses, each of which corresponds to a portion of the track. Only two logical block addresses 157 and 159 are shown for the sake of clarity. In accordance with the following description, track 153 will be said to lie in the origin cylinder (which is the collection of tracks on the discs in the disc pack which are axially aligned with track 153) and track 155 will be said to lie in the destination cylinder (which is the collection of tracks on the discs in the disc pack 112 which are axially aligned with track 155).

FIG. 5 is a flow diagram which illustrates one embodiment of an amplitude modulation detection method (or qualification method) in accordance with the present invention. The process begins and an origin cylinder (e.g., the cylinder containing track 153) and a destination cylinder (e.g., the cylinder containing track 155) are first identified. This is indicated by blocks 150, 152 and 154 in FIG. 5. The origin cylinder and destination cylinder can be identified arbitrarily or empirically. If chosen empirically, they are illustratively chosen based on where the most errors will be captured after an extended seek operation from one to the other. In one illustrative embodiment, cylinder 0 is chosen as the origin cylinder, and cylinder 350 is chosen as the destination cylinder, although any other cylinders can be used as well.

Once the origin and destination cylinders are identified, the minimum logical block address on the origin cylinder is located. This is indicated by block 156 in FIG. 5. Next, the maximum logical block address on the origin cylinder is located. This is indicated by block 158. The details of locating the maximum logical block address on the origin cylinder are described with respect to FIG. 6 below.

A destination logical block address on the destination cylinder is then chosen. This is indicated by block 160. The destination logical block address on the destination cylinder is illustratively offset relative to a logical block address on the destination cylinder which exhibits a minimum seek time from an origin location on the origin cylinder. This is described in greater detail with respect to FIG. 7.

After a destination logical block address on the destination cylinder is chosen, an origin logical block address on the origin cylinder is chosen. This is indicated by block 162. The origin logical block address and the destination logical block address are the two addresses which are used for the origin and destination of continuous seek operations. The seek operations are performed between these two logical block addresses, along with associated write and read operations. This is indicated by block 164.

More specifically, the drive is configured to seek from the origin location on the origin cylinder to the destination logical block address on the destination cylinder and to immediately perform a write operation (within two milliseconds of the end of the seek operation). That data is then read and it is determined whether any errors are detected. The head then seeks from the destination cylinder to the origin logical block address on the origin cylinder where a write operation is immediately is performed (within two milliseconds of the end of the seek operation). That data is then read and errors are again detected. Such continuous seek operations are performed in both directions a desired number of times and all errors are logged. This is described in greater detail with respect to FIG. 8.

It is then determined whether the total number of errors exceeds a threshold number of errors. This is indicated by block 166. If so, this indicates that the drive is exhibiting amplitude modulation in the read back signal which is so great that it induces errors and thus the present disc drive is disqualified. This is indicated by block 168.

However, if at block 166, the number of errors is not greater than the threshold number, then the drive is not exhibiting such great amplitude modulation that it is inducing undue errors, and the drive is qualified and the procedure is finished such that the next drive can be qualified. This is indicated by blocks 170 and 172.

FIG. 6 is a more detailed block diagram illustrating how the maximum logical block address on the origin cylinder is located (as corresponding to block 158 in FIG. 5). First, the minimum logical block address on the origin cylinder is selected. This is provided as minimum logical block address 0 and is indicated by block 176 in FIG. 6.

Next, the selected logical block address is converted to its physical address. This is indicated by block 178. For example, when the drive seeks to the selected logical block address, the controller must convert the logical block address to its physical block address in order to seek there.

It is next determined whether a new data head has been selected, or whether a cylinder change has been detected. This is indicated by block 180. If either a new data head has been selected, or the cylinder has changed, that indicates that the previous logical block address corresponded to the last, or maximum, logical block address on this cylinder (the origin cylinder). Therefore, the selected logical block address minus one is identified as the maximum logical block address on this track (or cylinder). This is indicated by block 182.

However, if, at block 180, it is determined that there has been no head change or cylinder change, then the selected logical block address is incremented by one and processing at blocks 178 and 180 are again repeated. In this way, each and every logical block address on the origin cylinder will be tested to determine whether it is the maximum logical block address on that cylinder. The maximum logical block address on the origin cylinder is thus identified.

FIG. 7 is a flow diagram illustrating, in greater detail, how the destination logical block address on the destination cylinder is chosen (as indicated by block 160 in FIG. 5). First, a logical block address on the destination cylinder is selected. This is indicated by block 186. Next, a seek is performed from the minimum logical block address on the origin cylinder to the selected logical block address on the destination cylinder. The seek is performed a predetermined number of times. This is indicated by block 188. The time it takes to perform this seek operation the desired number of times is detected and logged.

It is then determined whether there are any additional logical block addresses on the destination cylinder which have not yet been seeked to. This is indicated by block 190. If so, then another logical block address on the destination cylinder is selected, as indicated by block 192, and the drive performs the seek operation from the minimum logical block address on the origin cylinder to the newly selected logical block address on the destination cylinder the predetermined number of times as indicated by block 188. Again, the time it takes to perform the seek operations is stored.

After the drive has seeked from the minimum logical block address on the origin cylinder to all of the logical block addresses on the destination cylinder (as determined at block 190) then the controller identifies the logical block address on the destination cylinder that has the minimum average seek time as a minimum seek location on the destination cylinder. This is indicated by block 194. The logical block address on the destination cylinder which is eventually chosen for the continuous seek operations has a predetermined offset relative to the minimum seek location identified. The predetermined relative offset, and its direction, are illustratively empirically determined based upon where the most errors are captured during the continuous seek operation. In one illustrative embodiment, the logical block address on the destination cylinder is chosen to be offset from the minimum seek location by 25 logical block addresses toward the maximum logical block address on the destination cylinder. Choosing the logical block address on the destination cylinder relative to the minimum seek location is indicated by block 196.

The logical block address on the origin cylinder which will be used in performing the continuous seek operations is chosen in the exact same way as that illustrated in FIG. 7, except that the destination and origin tracks are interchanged. In other words, a logical block address on the origin cylinder is first selected and a predetermined number of seeks are performed to that selected logical block address from the minimum logical block address on the destination cylinder. Each of the logical block addresses on the origin cylinder is selected and has the predetermined number of seeks performed thereto. The logical block address on the origin cylinder which has the minimum average seek time is identified as the minimum seek location on the origin cylinder and the eventual logical block address on the origin cylinder which is chosen for the continuous seek operations has a predetermined offset from the minimum seek location. Thus, it can be seen that this process is identical to that set out in FIG. 7, except that the origin and destination cylinders are interchanged.

FIG. 8 is a more detailed block diagram of the continuous seek operations illustrated by block 164 in FIG. 5. First, the drive moves the data head to an origin position from which the continuous seek operations will begin. In one illustrative embodiment, the drive performs a write operation on the minimum logical block address of the origin cylinder. This ensures that the seek will begin from the same position on the origin cylinder each time. This is indicated by block 200.

A seek operation is then performed to the chosen logical block address on the destination cylinder. This is the logical block address chosen according to the method shown in FIG. 7. This is indicated by block 210. A write operation is immediately performed to the chosen logical block address on the destination cylinder as indicated by block 220. In one illustrative embodiment, the write operation is performed within two milliseconds of the end of the seek operation. This ensures that the write operation will be performed prior to the time in which the data head has stabilized in the z-axis.

The data is then read from the chosen logical block address on the destination cylinder. This is indicated by block 230. The data which has been read is compared to the data which was to have been written to that logical block address, and any errors are logged. This is indicated by block 240.

The drive then seeks from a location on the destination cylinder to the chosen logical block address on the origin cylinder. This is indicated by block 242. In one illustrative embodiment, the drive first performs a write to a location on the destination cylinder in order to ensure that the seek will begin from the same position on the destination cylinder every time.

After the drive has seeked to the chosen logical block address on the origin cylinder, a write operation is performed to the chosen logical block address on the origin cylinder as is indicated by block 244. Again, the write operation is illustratively performed within two milliseconds of the end of the seek operation. The data is then read and errors are logged as indicated by blocks 246 and 248.

In one illustrative embodiment, these seek operations are performed in both directions a desired number of times. The number of times can be user definable, or can be empirically determined. It is determined at block 250 whether the seek operations have been performed the desired number of times. If not, processing continues at block 200 and they are performed again. If so, however, the number of errors associated with the seek operations is logged and output. The seek operations are then complete. This is indicated by blocks 252 and 254 in FIG. 8.

Again, as indicated with respect to FIG. 5, the number of errors associated with this operation are compared to a threshold number of errors and the drive is either disqualified, or qualified, depending upon whether the number of errors meets the threshold.

It can thus been seen that the present invention includes a method of qualifying disc drive 110 by identifying (194) a minimum seek destination location on a destination cylinder (such as 155) that has a to minimum seek time on the destination cylinder from a chosen location on an origin cylinder (such as 153); choosing 196 a destination test location having a predetermined offset relative to the minimum seek location on the destination cylinder. The invention also includes seeking 164 from the origin location to the destination test location; writing 220 data to the destination test location and reading 230 the written data from the destination test location; detecting errors 240 at the destination test location by determining whether data to be written to the destination test location was actually read; and qualifying 166–170 the disc drive based on the errors detected.

The invention may also include identifying a minimum seek origination location that has a minimum seek time from a chosen seek start location on the destination cylinder (such as 155) and choosing an origin test location on the origin cylinder (155) having a predetermined offset relative to the minimum seek origin location.

The invention may further comprise seeking 242 from the chosen seek start location on the destination cylinder (155) to the origin test location and, after seeking, writing 244 data to the origin test location and reading 246 the written data from the origin test location and detecting errors 248 at the origin test location by determining whether data written to the origin test location was read.

In one embodiment, the disc drives 110 are qualified or disqualified 168, 170 based upon whether the errors detected meet a threshold 166.

In another embodiment, the seeking, writing, and error detecting steps are repeated a predetermined number of times prior to the qualifying step. In still other embodiments, the seeking, writing and error detecting steps are repeated in both directions (from the origin cylinder 153 to the destination cylinder 155 and from the destination cylinder 155 to the origin cylinder 153) a predetermined number of times.

In another embodiment, the origin location is chosen as a first logical block address on logical cylinder 0 and the destination cylinder is chosen as logical cylinder 350.

In still another embodiment, the destination test location is chosen as being offset by approximately 25 logical block addresses toward a maximum logical block address on the destination cylinder from the minimum seek destination location.

The invention can also be embodied as a method of detecting amplitude modulation in a write signal used by a transducer to write data to a disc 112 in a disc drive 110 based on data written to and read from the disc 112. The method includes positioning 162 the transducer at an origin location on an origin cylinder 153; repeatedly seeking 164 from the origin location to a destination test location on a destination cylinder 155; for each seeking step, writing 220 test data to the destination test location within approximately two milliseconds (2 ms) of an end of the seeking step; reading 230 the data written to the destination test location; and detecting 240 errors in the data read from the destination test location.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the drive while maintaining substantially the same functionality without departing from the scope and spirit of the present invention. In addition, although the illustrative embodiment described herein is directed to a hard drive for a computer system, it will be appreciated by those skilled in the art that the teachings of the present invention can be applied to other systems, like optical or other systems, without departing from the scope and spirit of the present invention.

What is claimed is:

1. A method comprising:

seeking from an origin location on a storage medium to a destination test location having a predetermined offset relative to a minimum seek location, identified as having a minimum seek time from the origin location, on the destination portion of the storage medium;

after the seeking step, writing data to the destination test location;

detecting errors at the destination test location by reading data from the destination test location was read; and qualifying the storage medium based on errors detected.

2. The method of claim 1 and further comprising:

identifying a minimum seek origin location that has a minimum seek time from a chosen seek start location on the destination portion; and choosing an origin test location on the origin portion having a predetermined offset relative to the minimum seek origin location.

3. The method of claim 2 and further comprising:

seeking from the chosen seek start location on the destination portion to the origin test location;

after seeking from the chosen seek start location writing data to the origin test location and reading the written data from the origin test location;

detecting errors at the origin test location by determining whether data to be written to the origin test location was read.

4. The method of claim 3 wherein the qualifying step comprises:

qualifying storage media for which a number of errors detected in detecting errors at the destination test location and detecting errors at the origin test location do not meet a predetermined threshold.

5. The method of claim 4 and further comprising:

repeating the steps of seeking from an origin location, writing data to the destination test location, and detecting errors at the destination test location a predetermined number of times prior to the qualifying step.

6. The method of claim 5 and further comprising:

repeating the steps of seeking from the chosen seek start location, writing data to the origin test location, and detecting errors at the origin test location a predetermined number of times prior to the qualifying step.

7. The method of claim 6 and further comprising:

choosing the origin location on the origin portion of the storage media as a first logical block address on logical cylinder 0.

8. The method of claim 6 and further comprising:

choosing the destination portion as logical cylinder 350.

9. The method of claim 1 wherein seeking from an origin location comprises:

seeking from the chosen location on the origin portion to a plurality of logical block addresses on the destination portion; and identifying one of the plurality of logical block addresses on the destination portion that has a minimum seek time as the minimum seek destination location.

10. The method of claim 1 wherein seeking from an origin location comprises:

choosing the destination test location as being offset by approximately 25 logical block addresses toward a maximum logical block address on the destination portion.

11. A method comprising:

repeatedly seeking from an origin location on an origin portion of a storage medium to a destination test location on a destination portion;

for each seeking step, writing test data to the destination test location within approximately two milliseconds (2 ms) of an end of the seeking step;

reading the data written to the destination test location; and detecting errors in the data read from the destination test location.

12. The method of claim 11 and further comprising:

repeatedly seeking from a destination start location to an origin test location on the origin portion;

for each seeking from a destination start location step writing test data to the origin test location within approximately two milliseconds of an end of the reading step.

13. The method of claim 12 and further comprising reading the data written to the origin test locations; and detecting errors in the data read from the origin test location.

14. The method of claim 13 and further comprising:

prior to the seeking from an origin location step, identifying a minimum seek destination location that has a minimum seek time on the destination portion from the origin location; and choosing the destination test location as a predetermined offset from the minimum seek destination location.

15. The method of claim 14 and further comprising:

prior to the seeking from a destination start location step identifying a minimum seek origin location that has a minimum seek time on the origin portion from a chosen seek start location on the destination portion; and choosing the origin test location as a predetermined offset from the minimum seek origin location.

16. The method of claim 14 wherein identifying a minimum seek destination location comprises:

selecting an address location on the destination portion;

seeking from the origin location to the selected address location on the destination portion;

repeating the steps of selecting and seeking for each address location on the destination portion; and choosing as the minimum seek destination location the address location having a shortest seek time.

17. The method of claim 15 wherein the identifying step comprises:

selecting an address location on the origin portion;

seeking from the destination location to the selected address location on the origin portion;

repeating the steps of selecting and seeking for each address location on the origin portion; and choosing as the minimum seek origin location the address location having a shortest seek time.

18. An apparatus comprising:

a transducer;

means for positioning the transducer relative to a storage media, controlling the transducer to write data to the storage media, and controlling the transducer to read data from the storage media to detect the amplitude modulation; and wherein the means for positioning comprises:

means for identifying a minimum seek destination location on a destination portion that has a minimum seek time on the destination portion from a chosen location on an origin portion; and means for choosing a destination test location having a predetermined offset relative to the minimum seek location on the destination portion.

19. The apparatus of claim 18 wherein the means for positioning comprises:

means for positioning the transducer at an origin location on an origin portion;

means for repeatedly seeking from the origin location to a destination test location on a destination portion;

means for writing test data to the destination test location after each seek to the destination test location, within approximately two milliseconds (2 ms) of an end of the seeking step; and means for reading the data written to the destination test location.

* * * * *

UNITED STATES PATENT AND TRADEMARK OFFICE
CERTIFICATE OF CORRECTION

PATENT NO. : 6,831,796 B2
DATED : December 14, 2004
INVENTOR(S) : YeongHeng Tan et al.

It is certified that error appears in the above-identified patent and that said Letters Patent is hereby corrected as shown below:

Title page,
Item [75], Inventors, for "Siew Kin Chow" delete "Singapore (SG)" and insert
-- Savage, MN (US) --.

Column 8,
Line 57, after ";" insert -- and --.

Column 9,
Line 46, after ";", insert -- and --.

Signed and Sealed this

Eighth Day of March, 2005

JON W. DUDAS
*Director of the United States Patent and Trademark Office*